Oct. 17, 1950     E. UHLMANN     2,526,053
MEANS FOR INDIRECT FORCED COMMUTATION OF STATIC
CURRENT CONVERTERS IN TWO-WAY CONNECTION
Filed April 4, 1946

Inventor
Erich Uhlmann.
By James Aiken
Attorney.

Patented Oct. 17, 1950

2,526,053

UNITED STATES PATENT OFFICE 2,526,053

MEANS FOR INDIRECT FORCED COMMUTATION OF STATIC CURRENT CONVERTERS IN TWO-WAY CONNECTION

Erich Uhlmann, Ludvika, Sweden, assignor to Allmanna Svenska Elektriska Aktiebolaget, Vasteras, Sweden, a Swedish corporation Application April 4, 1946, Serial No. 659,478
In Sweden April 21, 1945

6 Claims. (Cl. 321—34)

For an indirect forced commutation of static current converters in two-way connection, it is generally not possible to employ the way of connecting a transition valve to the neutral point of the transformer which is most common in one way connections. Even if there is a separate transformer for each converter, a connection of the neutral point of this transformer to a transition valve necessitates an insulation of the neutral point for a voltage of the same order of magnitude as the phase voltage, which means an essential complication. For higher voltages, for which two-way connections are most frequently employed, transformers connected in Y/Y are also most frequently used, and in such transformers the reactances in commutating to the neutral point are prohibitively high.

According to the present invention, which refers to means for forced commutation of static current converters in a two-way connection by means of transition valves, each pair of main valves is connected, without the intermediary of any transformer winding, to a pair of transition valves belonging to the same phase. Since two-way connections chiefly are employed for high voltages, it is a great advantage in such connections to avoid entirely transformer windings in the transition circuits serving the commutation, such windings for high voltages being not only expensive, but also requiring large insulation distances and therefore introducing high leakage reactances. Moreover, such transformers are objectionable because of their direct current saturation.

Figure 1:
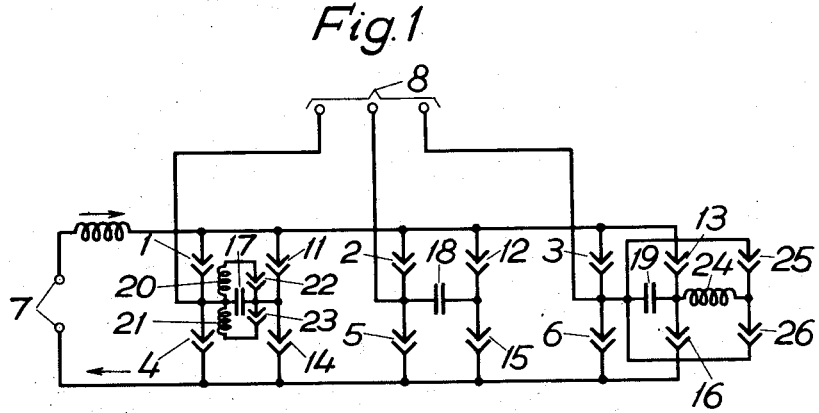
Figure 2:
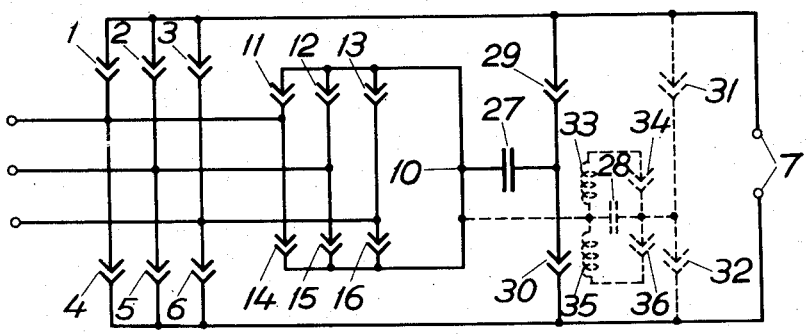

Two forms of the invention are diagrammatically illustrated in the accompanying drawing in Figs. 1 and 2.

In Fig. 1, 1–6 are six main valves connected in a usual manner in a threephase, six-pulse two-way connection between two direct current poles 7 and three alternating current poles 8. In parallel to each pair of main valves 1—4, 2—5, and 3—6, there is connected between the direct current poles a pair of transition valves 11—14, 12—15, and 13—16. Between the alternating current poles and the pairs of transition valves, there are further connected commutation condensers 17, 18, 19. Other details illustrated in Fig. 1 are of inferior importance and are to be described hereinafter.

If a forced commutation shall take place for instance from the valve 1 to the valve 2, the valve 11 is first liberated, while the condenser 17 is supposed to be charged to an appropriate voltage with the left conducting layer positive. The valve 11 then discharges through the condenser and instantaneously absorbs the current from the valve 1, as no reactance in the path of the short-circuit current through the two valves retards this absorption. By the said current, the charge of the condenser 17 is reversed to positive voltage on the right conducting layer. As soon as the reversal of charge has proceeded to an appropriate value, the valve 2 is liberated and then absorbs the current from the valve 11. This commutation, on the other hand, is not instantaneous, as the path of the short-circuit current contains the reactance of the external alternating current circuit between the valves 1 and 2. At the end of the commutation, the reversed charging of the condenser should have proceeded so far as to make it ready for initiating the next commutation to be effected by the condenser. This commutation goes from the valve 4 to the valve 5 and begins thus half a cycle later than that just described.

At low current load, it is favorable if the commutation can be extended over a long space of time, in which case the condenser can be charged to the voltage required for the next commutation only by means of the load current, thus without an auxiliary discharge circuit. With the connection described, in which each condenser functions only once in each half cycle, it is possible to extend the time of commutation to nearly half a cycle, which preferably means, with the function described, that the commutation begins earlier than would be necessary with a minimum time of commutation and is terminated at the same time. The phase-compensating action intended to be accomplished by the forced commutation could often be spared at a minimum of load, and therefore this connection makes it possible to avoid graded capacities or separate auxiliary discharging circuits entering into function at low load. For the sake of completeness, however, Fig. 1 shows two examples of such auxiliary discharging circuits, one of which is shown in connection with the condenser 17 and the other in connection with the condenser 19. In reality, the circuits are of course made equal for the three condensers.

In the example shown in connection with the condenser 17, there are two auxiliary circuits independent of one another, one for each direction of current through the condenser, each circuit containing a reactor 20, 21 respectively and a valve 22, 23, respectively. The circuit containing the reactor 20 and the valve 22 cooperates with the transition valve 11, while the circuit containing the reactor 21 and the valve 23 cooperates with the transition valve 14. The reactors 20 and 21 have, however, preferably one common core.

In the example shown in connection with the condenser 19, a reactor 24 is common to both auxiliary circuits, each of which has a valve 25, 26 respectively. The valve 25 cooperates with the valve 13 and increases the discharge current from the condenser 19, when the transition valve takes too little current for reversing the charge of the condenser. The valve 26 cooperates in the same manner with the valve 16.

In Fig. 2, the main valves are still designated by 1-6, the direct current poles by 7, and the alternating current poles by 8. The transition valves are also, as in Fig. 1, designated by 11-16 and directly connected to the same alternating current poles as the main valves. At their other ends they are, however, not directly connected to the direct current poles, but to a neutral point 18 which is connected to the direct current poles through a condenser 27 and a pair of separate valves 29, 30. In this connection, only one condenser is in the first line necessary for the forced commutation, but this condenser must function six times during each cycle, and therefore the commutation cannot be extended over one sixth of a cycle, whence so great load variations cannot be met as in Fig. 1. It may therefore be advisable to amplify the installation either by one or more auxiliary discharge circuits to the condensator illustrated or by a smaller condenser 28 connected in parallel thereto and having valves 31, 32, as indicated in dotted lines. Especially by providing this smaller condenser with auxiliary discharge paths 33, 34 and 35, 36 for both discharge directions a possibility is obtained of varying the load within very wide limits at the same control ratio. As regards the distribution of the commutation capacity on several condensers, this connection offers at any rate the advantage over that shown in Fig. 1 that the total number of condensers for the same grading is reduced to one third.

The manner of operation of the connection according to Fig. 2 will be essentially analogous to that described in Fig. 1. For instance, at a commutation between the main valves 1 and 2, the transition valve 11 and the auxiliary valve 29 may be liberated on an appropriate instant, the condenser 27 being then presumed to be charged with the left conducting layer positive. The current then flows from the upper direct current pole through the valve 29, condenser 27 and transition valve 11 to the topmost alternating current pole. The commutation to this path takes place instantaneously, as the short-circuit path through it and the valve 1 does not contain any reactance. After the partial reversal of the charge of the condenser, a commutation takes place from the transition valve 11 to the valve 2 through the external line reactance, the condenser being then fully charged in the opposite direction so as to be ready for the next commutation which goes from the valve 6 to the valve 4.

In Fig. 1 as well as in Fig. 2, the transition valve connected to the relieving phase can be chosen for the commutation instead of that connected to the relieved phase, for instance the transition valve 12 instead of 11 for the commutation from 1 to 2. The principal difference will then be, that the first step of the commutation then takes longer time, because it goes over the external inductance, while the second step goes instantaneously. Which way of commutation is the most favorable depends on the phase angle in which the commutation takes place, and generally it may be so expressed, that the first named type of commutation is more favorable for inversion and the second one for rectifying, because these two cases give the best utilisation of the condenser and the smoothest voltage curves between the direct current poles. In principle, also the possibility exists to use for the commutation between two phases the transition valve connected to the third phase, but this is as a rule unfavorable already because of the unnecessarily large commutation reactances thereby introduced.

I claim as my invention:

1. Means for commutating static current converters, comprising alternating current and direct current poles, a pair of oppositely directed main valves connecting each alternating current pole to said direct current poles, and a pair of series-connected transition valves directly connected to each pair of main valves without intermediary transformer windings.

2. Means for commutating static current converters, comprising alternating current and direct current poles, a pair of oppositely directed main valves connecting each alternating current pole to said direct current poles, a pair of transition valves associated with said pair of main valves, and a condenser between each pair of main valves and said associated pair of transition valves.

3. Means for commutating static current converters comprising alternating current and direct current poles, a pair of oppositely directed main valves connecting each alternating current pole to said direct current poles, a pair of oppositely directed transition valves associated with said pair of main valves and connecting each alternating current pole with two neutral points, and a condenser and auxiliary valve connecting said neutral points to said direct current poles.

4. Means as claimed under 3, in which at least two condensers with associated auxiliary valves are connected in parallel between each neutral point and the corresponding direct current pole.

5. Means as claimed under 3, in which at least two condensers of different capacity with associated auxiliary valves are connected in parallel between each neutral point and the corresponding direct current pole, the smallest condensers having auxiliary discharge circuits.

6. Means as claimed under 1, in which the transition valve associated with a certain main valve is adapted to function when relieved by said main valve in rectifying, while the transition valve associated with a certain main valve is adapted to function when relieving said main valve in inversion.

ERICH UHLMANN.

REFERENCES CITED

The following references are of record in the file of this patent:

UNITED STATES PATENTS

| Number | Name | Date |
|---|---|---|
| 1,860,182 | Howard | May 24, 1932 |
| 1,952,052 | Bedford | Mar. 27, 1934 |
| 2,005,458 | Eriksson et al. | June 18, 1935 |
| 2,202,720 | Spielhagen | May 28, 1940 |
| 2,204,805 | Lamm et al. | June 18, 1940 |

FOREIGN PATENTS

| Number | Country | Date |
|---|---|---|
| 417,600 | Great Britain | Oct. 3, 1934 |